United States Patent [19]

Steigerwald et al.

[11] Patent Number: 5,414,238

[45] Date of Patent: May 9, 1995

[54] RESONANT POWER SUPPLY FOR AN ARCJET THRUSTER

[75] Inventors: Robert L. Steigerwald, Burnt Hills; John N. Park, Rexford, both of N.Y.

[73] Assignee: Martin Marietta Corporation, East Windsor, N.J.

[21] Appl. No.: 956,130

[22] Filed: Oct. 2, 1992

[51] Int. Cl.6 .................. B23K 9/073; B23K 9/067
[52] U.S. Cl. .................. 219/121.54; 219/121.57; 219/130.4; 219/121.48; 60/203.1
[58] Field of Search .............. 219/121.43, 121.54, 219/121.48, 121.57, 130.4; 60/203.1; 363/26, 37, 17

[56] References Cited

U.S. PATENT DOCUMENTS

| | | | |
|---|---|---|---|
| 4,642,745 | 2/1987 | Steigerwald et al. | 363/37 |
| 4,766,724 | 8/1988 | Gruber | 60/203.1 |
| 5,225,658 | 7/1993 | Yamaguchi et al. | 219/121.57 |

FOREIGN PATENT DOCUMENTS 0228796  11/1986  European Pat. Off. .

8402041  10/1983  WIPO .

OTHER PUBLICATIONS

R. L. Steigerwald, "A Comparison of Half–Bridge Resonant Converter Topologies", IEEE Transactions on Power Electronics, vol. 3, No. 2, Apr. 1988.

*Primary Examiner*—Mark H. Paschall
*Attorney, Agent, or Firm*—J. M. Breedlove; W. H. Meise; C. A. Berard

[57] ABSTRACT

A power supply for a thruster for space applications (e.g., an arcjet thruster) comprises a series/parallel resonant converter wherein the load quality (Q) factor of the resonant tank circuit inherently varies with arc voltage so as to accommodate changes in arc voltage from initiation thereof through steady-state operation. Effectively, the resonant tank circuit acts as a ballast by matching the arc during initiation thereof through steady-state operation. Furthermore, the resonant converter operates in a soft-switching, low-voltage switched mode so as to maximize efficiency.

2 Claims, 6 Drawing Sheets

RESONANT POWER SUPPLY FOR AN ARCJET THRUSTER

RELATED APPLICATIONS

This application is related to U.S. patent application Ser. No. 07/955,970, pending filed Oct. 2, 1992 in the name of Steigerwald and J. N. Park, and to U.S. patent application Ser. No. 07/956,131, pending filed Oct. 2, 1992 in the name of Park, R. L. Steigerwald, G. D. Goodman and D. B. Stewart, both filed concurrently herewith and incorporated by reference herein.

FIELD OF THE INVENTION

The present invention relates to thrusters for space applications and, more particularly, to an efficient and lightweight resonant power supply therefor.

BACKGROUND OF THE INVENTION

An arcjet thruster provides a thrust to a spacecraft by heating a gas with an electric arc and expanding the heated gas through a nozzle. Over a practical operating range, the arc has a negative resistance characteristic, i.e., arc voltage decreases with increasing arc current, and is thus inherently unstable. A typical power supply for an arcjet thruster employs a pulse width modulated (PWM) converter operating in a current-controlled mode. Disadvantageously, however, operation of such converters involves hard, i.e., lossy, switching, such that operating frequencies are relatively low (e.g., 20 kHz), thus necessitating the use of relatively large and heavy magnetic and capacitive components.

Accordingly, it is desirable to provide an efficient and lightweight power supply for an arcjet thruster.

SUMMARY OF THE INVENTION

A power supply for a thruster (e.g., an arcjet thruster) comprises a resonant converter having a resonant tank circuit with an inherently adjustable load quality (Q) factor which accommodates changes in arc voltage from initiation through steady-state operation. In particular, a higher voltage at a lower current is needed to initiate the arc; and, stable steady-state operation is in a range from relatively low arc voltage and relatively high arc current to a relatively high arc voltage and relatively low arc current. Effectively, the resonant tank circuit acts as a ballast by matching the arc during initiation thereof through steady-state operation. In a preferred embodiment, the resonant converter comprises a series/parallel resonant converter. Furthermore, the resonant converter operates in a soft-switching mode so as to allow high-frequency operation and maximize efficiency.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
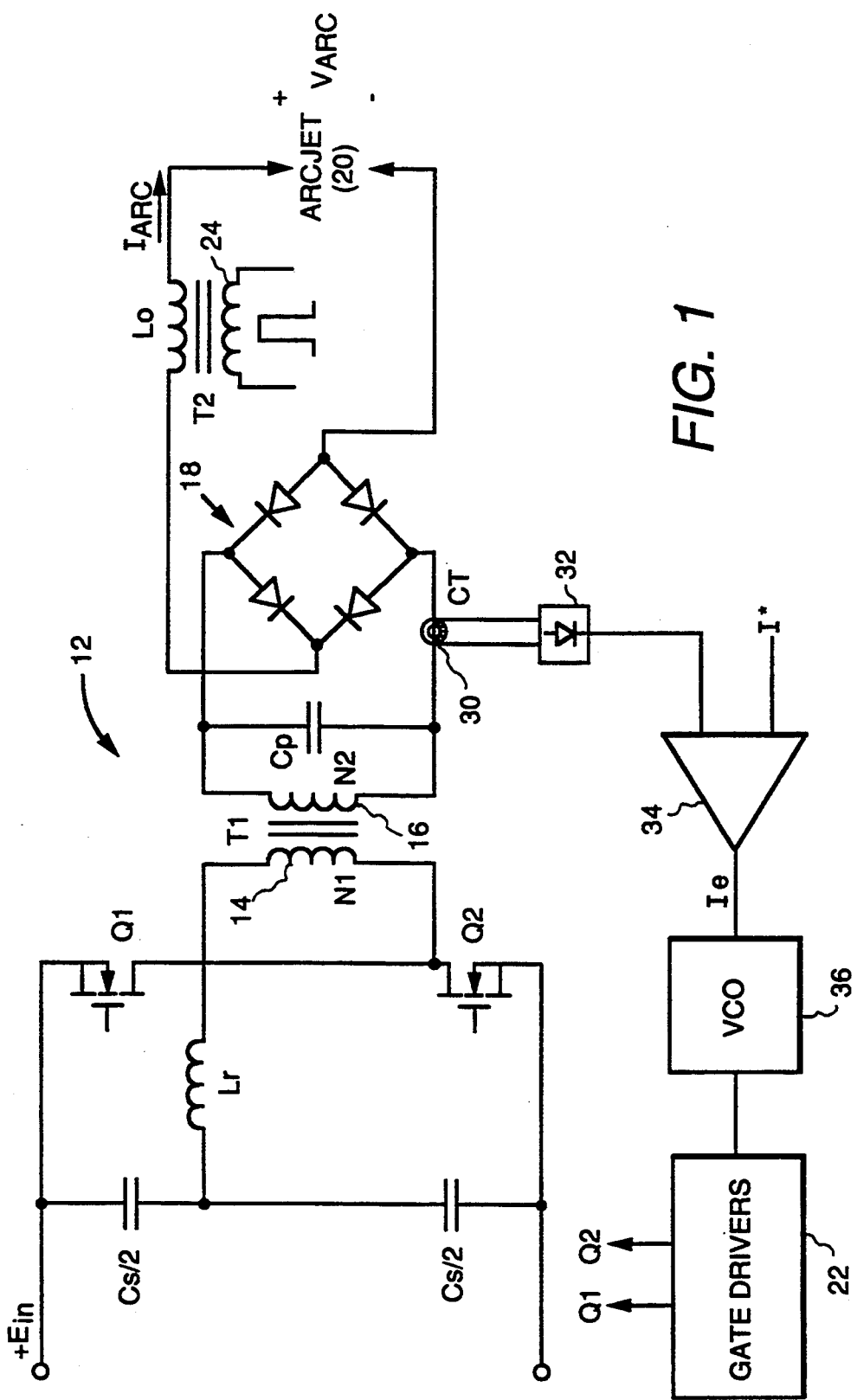
FIG. 1 schematically illustrates a resonant power supply for an arcjet thruster in accordance with the present invention.

FIG. 1 illustrates a power supply for driving a thruster for space applications, such as, for example, an arcjet thruster, in accordance with the present invention. The power supply of FIG. 1 includes a series/parallel resonant converter 12 employing two switching devices Q1 and Q2 coupled in series in a half-bridge configuration across an input dc voltage Ein and a resonant tank circuit. The resonant tank circuit comprises: a resonant inductor Lr, a series resonant capacitor Cs (comprising two capacitors Cs/2 coupled dynamically in parallel), and a parallel resonant capacitor Cp. A transformer T1 provides isolation and impedance transformation between converter 12 and the load. Transformer T1 has a primary winding 14 (with a number of turns N1) coupled between the resonant inductor Lr and the junction between switching devices Q1 and Q2; and a secondary winding 16 (with N2 turns) coupled across parallel resonant capacitor Cp. Although resonant inductor Lr is shown as being situated on the primary side of transformer T1, it could alternatively be situated on the secondary side. The resonant load circuit is coupled across parallel resonant capacitor Cp and comprises a combination of a diode rectifier 18, a filter inductor Lo for smoothing the dc current supplied to the arc, and the arcjet load 20.

Figure 2:
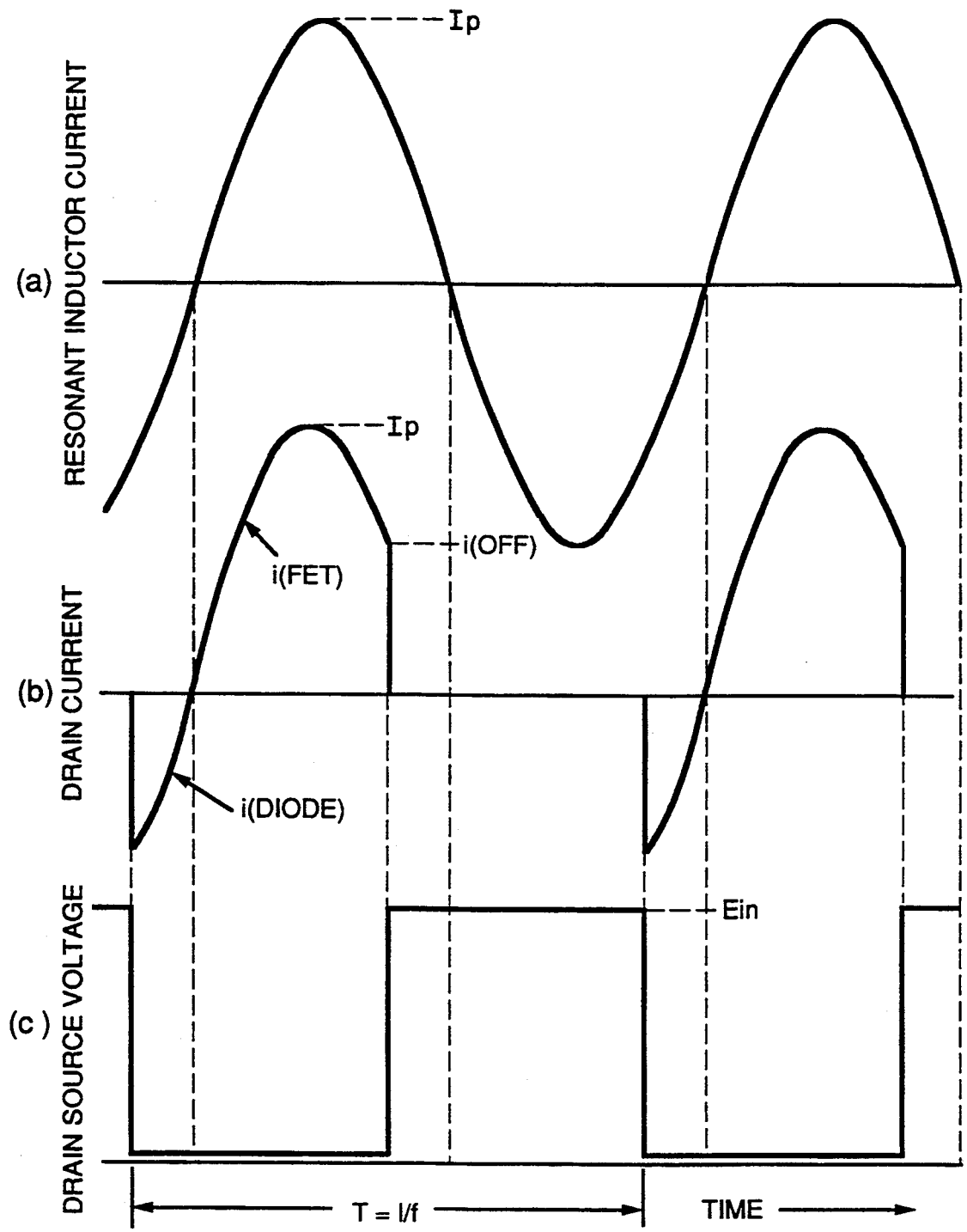
FIG. 2 graphically illustrates (a) resonant inductor current, (b) active device current, and (c) active device drain-source voltage for the resonant power supply of FIG. 1.

In operation, transistors Q1 and Q2 are switched alternately at high frequency by gate drive circuitry 22 to supply an approximate square wave voltage to the resonant load circuit. Preferably, the resonant converter is operated slightly above the resonant frequency of the tank circuit in order to maintain soft, i.e., nearly lossless, zero-voltage switching, as described in "A Comparison of Half-Bridge Resonant Converter Topologies" by R. L. Steigerwald, *IEEE Transactions on Power Electronics*, Vol. 3, No. 2, April 1988, which is incorporated by reference herein; and the frequency is varied to control the output current in accordance with a current command I* as described hereinbelow FIG. 2 graphically illustrates ideal waveforms of (a) resonant inductor current, (b) switching device (Q1 and Q2) current, and (c) switching device drain-source voltage for the resonant power supply of FIG. 1. As shown, the resonant inductor current is nearly sinusoidal, and the transistor currents are sections of sinusoids. Furthermore, because the inherent inverse parallel diode (not shown) of each transistor Q1 and Q2 is conducting just before the respective transistor turns on, zero-voltage switching is achieved, allowing for high frequency operation. In addition, the parallel resonant capacitor Cp acts as a substantially lossless snubber across rectifier bridge 18, so that low-loss, zero-voltage switching of the rectifier bridge is also achieved. As a result, the resonant converter operates with low-loss switching.

The output filter inductor Lo comprises the secondary winding of a high-voltage pulse transformer T2 which generates a high voltage pulse (e.g., up to 5000 V) to initiate the arc. The high start-up voltage can be generated, for example, by a direct transformer step-up of a voltage pulse applied to the primary winding 24 of transformer T2, or by storing energy in inductor Lo and releasing it in a flyback manner to generate the pulse, such as in the manner described in Gruber U.S. Pat. No. 4,766,724, issued Aug. 30, 1988 and incorporated by reference herein.

Once the arc is initiated, the arc voltage drops significantly (e.g., as low as 20 V), at which time it is desirable to supply the arc with a controllable current. In response to the controllable current, the arc voltage increases toward its steady-state operating value. In particular, the steady-state operating value is in a steady-state operating range which extends from a lower arc voltage to a higher arc voltage.

Once the steady-state is achieved, the arc current is usually controlled such that constant power is delivered to the arc, i.e., Varc×Iarc=constant, where Varc represents the arc voltage and Iarc represents the arc current. Thus, at a lower arc voltage (e.g., approximately 100 V), more current is needed and the resonant tank is relatively highly loaded, such that the resonant tank effectively operates as a series resonant circuit.

At a higher arc voltage (e.g., 140 V), less arc current is needed and the tank circuit is relatively lightly damped, such that the resonant tank circuit effectively acts as a parallel resonant converter.

Figure 3:
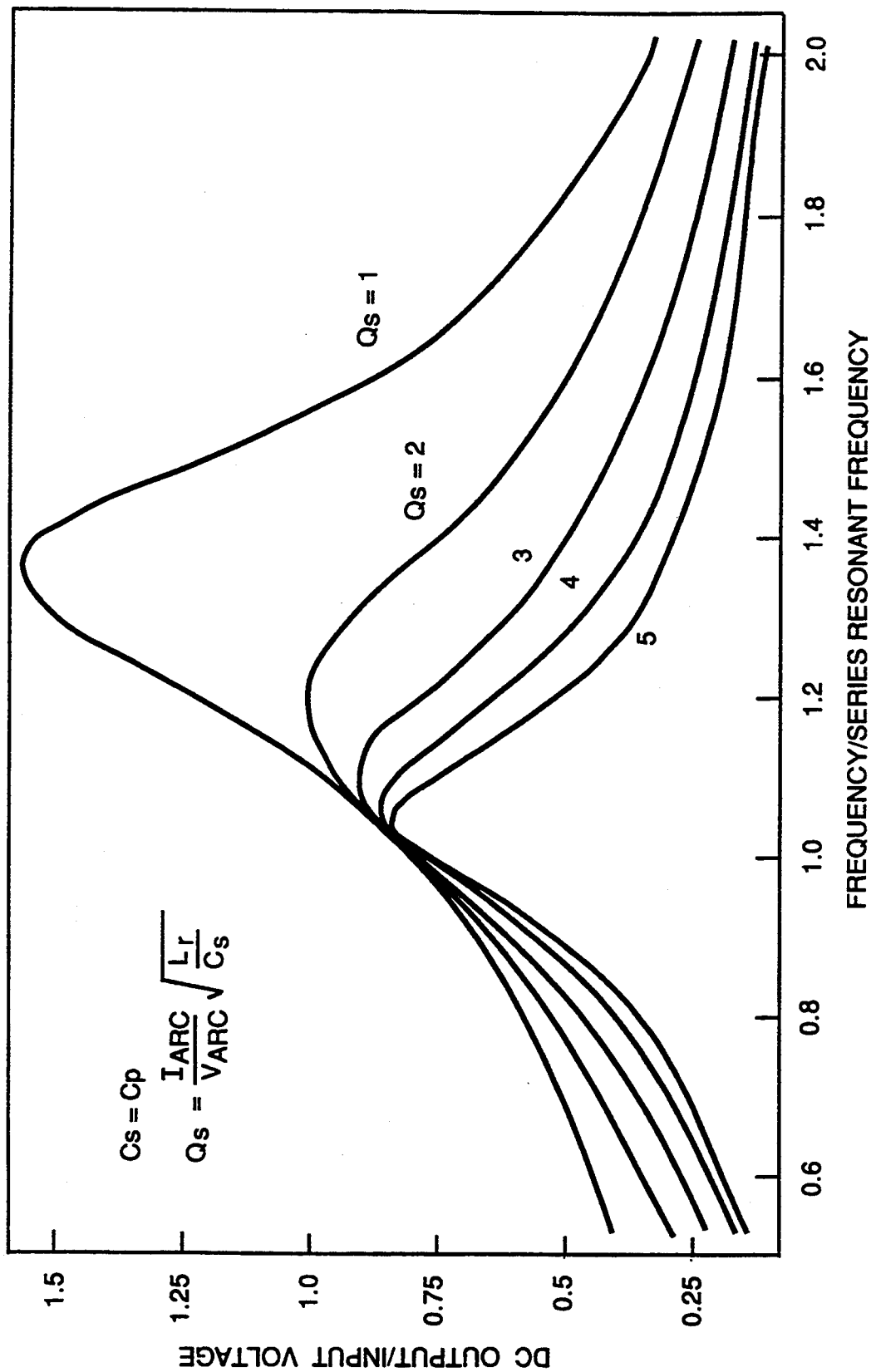
FIG. 3 graphically illustrates normalized output voltage versus frequency for different ratios of series to parallel capacitances for the resonant power supply of FIG. 1.

FIG. 3 shows the output voltage as a function of normalized resonant frequency with Qs, the series loaded Q factor $$\left( Qs = \frac{Varc}{Iarc} \sqrt{\frac{Lr}{Cs}} \right),$$

as a parameter for a series/parallel resonant converter. (Normalized frequency is actual frequency divided by the series resonant frequency, i.e., the frequency at which series resonant capacitor Cs resonates with resonant inductor Lr.) For the particular example of FIG. 3, Cs=Cp; however, other capacitance ratios are possible. Qs is low for light loads (small tank damping) and is higher for heavy loads (large tank damping). FIG. 3 shows that the output voltage attainable at light load currents (i.e., at higher arc voltages) is higher than that attainable at heavy load currents (i.e., lower arc voltages) for a given output power. The converter circuit is matched to the arc characteristics.

Referring back to FIG. 1, frequency is adjusted in order to control the load current in response to the current command I*. In particular, the load current is measured by a current sensor 30, shown as a current transformer in FIG. 1. The output of current transformer 30 is rectified by a rectifier 32, resulting in a signal representative of the dc current in inductor Lo and the arc. The current signal from rectifier 32 is compared in an error amplifier 34 to the current command I*, and the resulting current error signal Ie is provided to a voltage-controlled oscillator (VCO) 36 for adjusting the operating frequency of the resonant converter, via gate drive circuitry 22.

Figure 4:
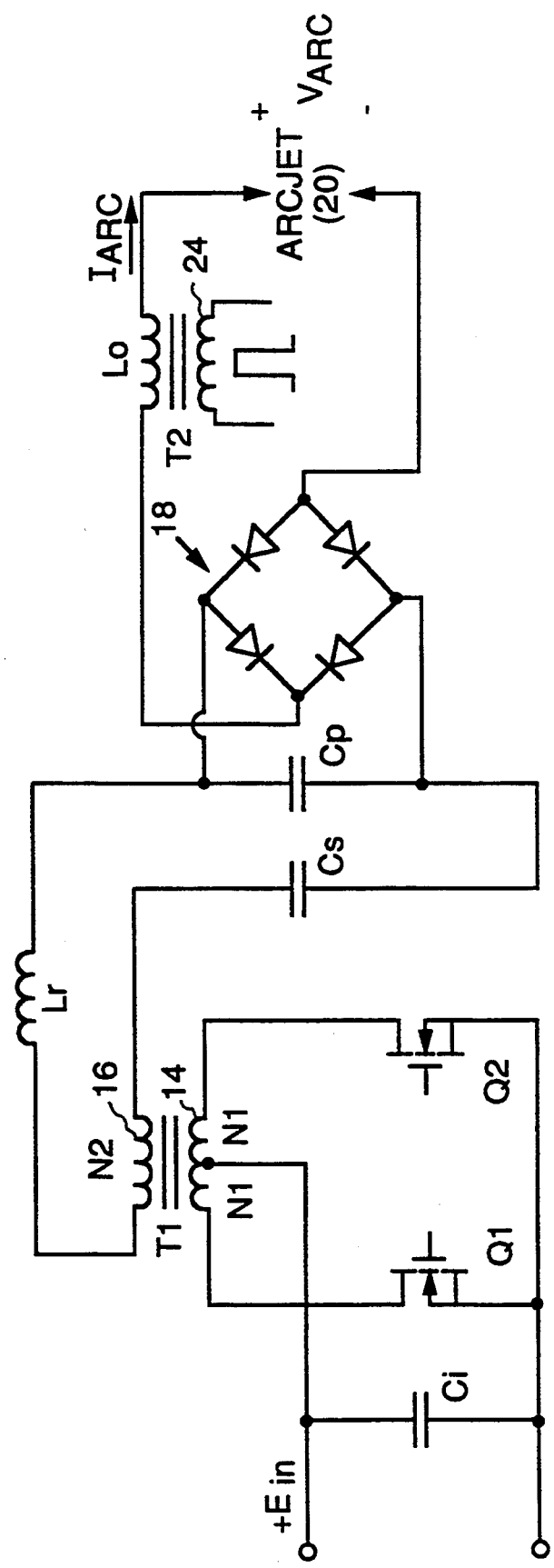
FIG. 4 schematically illustrates an alternative embodiment of a resonant power supply for an arcjet thruster of the present invention employing a push-pull converter configuration.

FIG. 4 illustrates an alternative embodiment of an arcjet thruster power supply of the present invention wherein the resonant converter comprises switching devices Q1 and Q2 coupled together in a push-pull configuration. In the embodiment of FIG. 4, an input filter capacitor Ci is coupled across dc source voltage Ein, and transformer T1 comprises a center-tapped primary winding with input voltage Ein coupled to the center tap thereof. As shown, series resonant capacitor Cs and resonant inductor Lr are connected in series with secondary winding 16 of transformer T1. (However, series resonant capacitor Cs and resonant inductor Lr could be located on the primary side of transformer T1 as in FIG. 1, if desired.)

Figure 5:
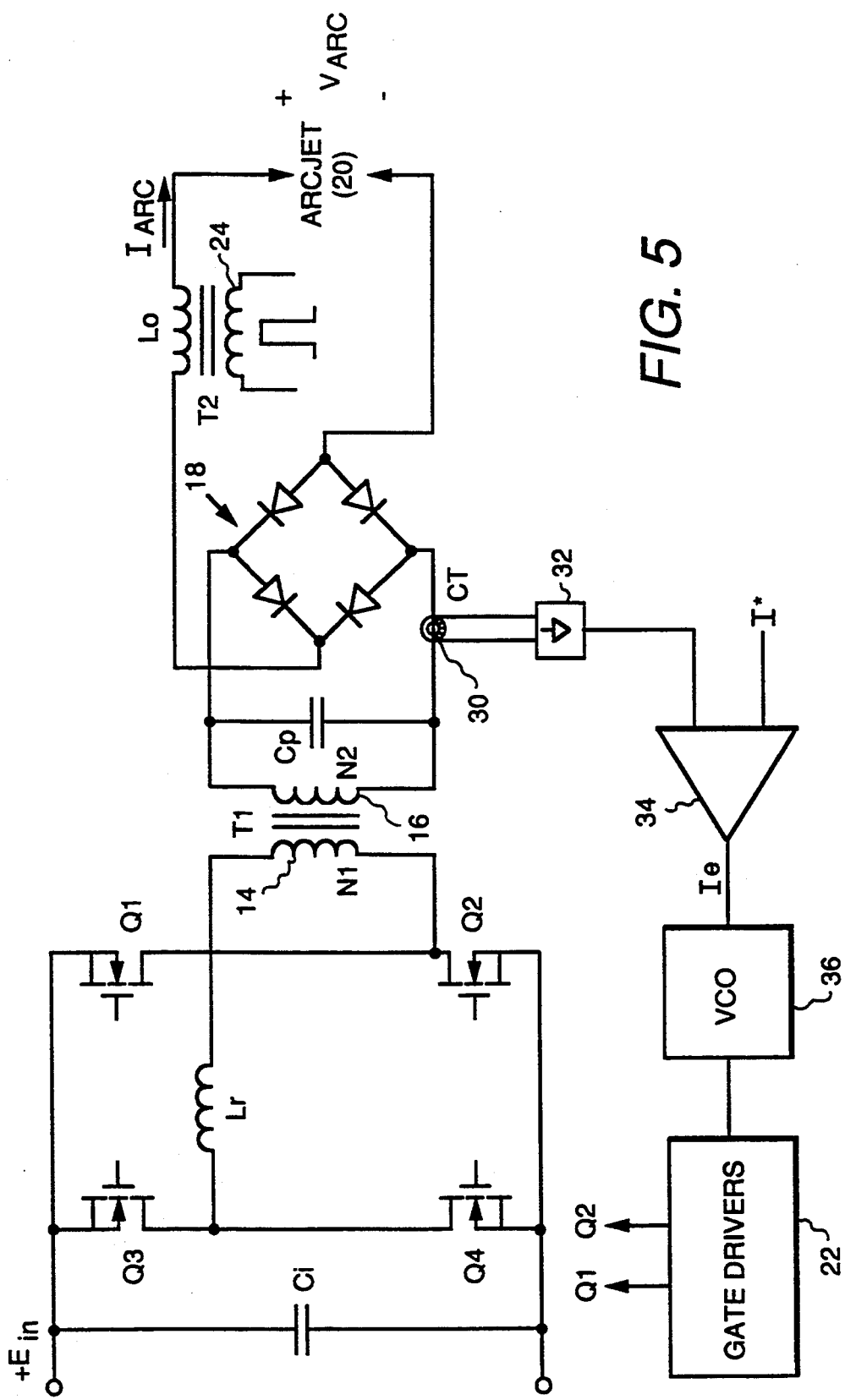
FIG. 5 schematically illustrates another alternative embodiment of a resonant power supply for an arcjet thruster of the present invention employing a full-bridge converter configuration.

FIG. 5 illustrates another alternative embodiment of an arcjet thruster power supply of the present invention wherein the resonant converter comprises four switching devices Q1–Q4 coupled together in a full-bridge configuration. For the full-bridge configuration, the control means may involve phase shift control 50 as well as frequency control. In particular, phase shift control involves phase-shifting the two phase legs of the bridge converter in order to control the fundamental component of voltage driving the resonant tank circuit in well-known manner. Advantageously, therefore, both resonant tank voltage and frequency can be controlled to regulate the output current. Commonly assigned U.S. Pat. No. 4,642,745 of Steigerwald and Kornrumpf, issued Feb. 10, 1987, which is incorporated by reference herein, describes exemplary frequency and phase shift controls.

Although the arcjet power supply of the present invention has been described as comprising a series/parallel resonant converter, other resonant converter topologies may be employed, such as series resonant or parallel resonant converter topologies. The series resonant or parallel resonant converter topologies may be particularly suitable for applications wherein the dynamic range of the arc voltage drop is limited. For example, as shown in the embodiment of FIG. 5, a parallel resonant converter is employed.

Figure 6:
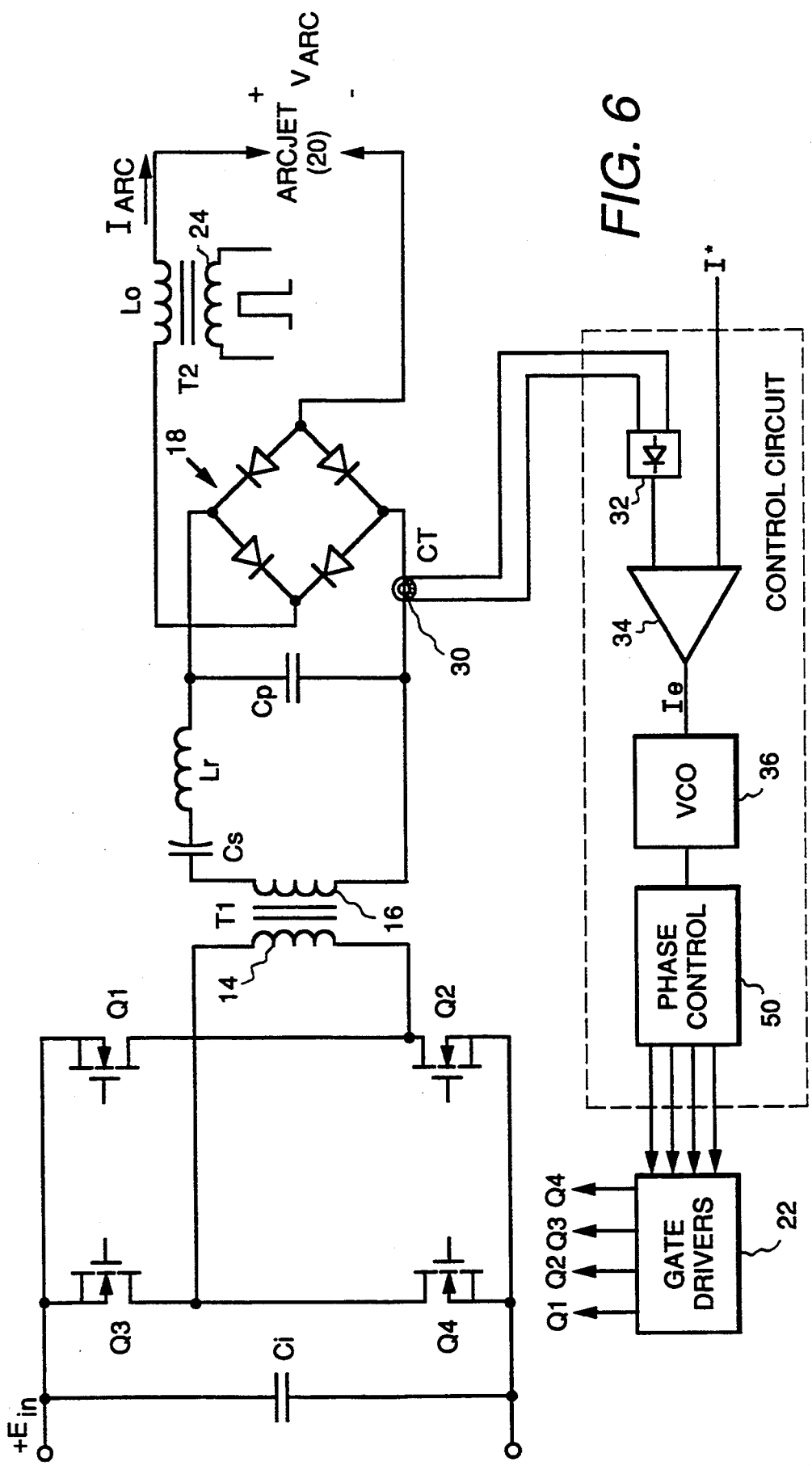
FIG. 6 schematically illustrates yet another alternative embodiment of a resonant power supply for an arcjet thruster of the present invention employing a full-bridge converter configuration.

FIG. 6 illustrates an alternative embodiment an arcjet thruster power supply employing a full-bridge converter configuration. In the embodiment of FIG. 6, a series/parallel resonant converter is employed with series resonant capacitor Cs and resonant inductor Lr situated on the secondary side of transformer T1.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A power supply for a thruster, comprising:
   a full-bridge resonant converter including a resonant tank circuit for stabilizing the load of said thruster; and
   control means for regulating the output current of said resonant converter substantially independent of an output voltage, the load quality factor of said resonant tank circuit varying in accordance with said output voltage and said output current so as to operate in a predetermined steady-state operating range, said steady-state operating range extending from a relatively low output voltage and a relatively high output current to a relatively high output voltage and a low output current.

2. The power supply of claim 1 wherein said control means comprises:
  frequency control means for adjusting the operating frequency of said resonant converter in response to an error current, said error current comprising the difference between a commanded current and the arc current; and
  phase control for phase shifting the voltage of each leg of the full-bridge with respect to the other in order to control the voltage applied to said resonant tank circuit.

* * * * *